Oct. 11, 1966     D. LAUERER ETAL     3,278,448
ULTRA-VIOLET PROTECTIVE LIGHT FILTER
Filed May 17, 1960
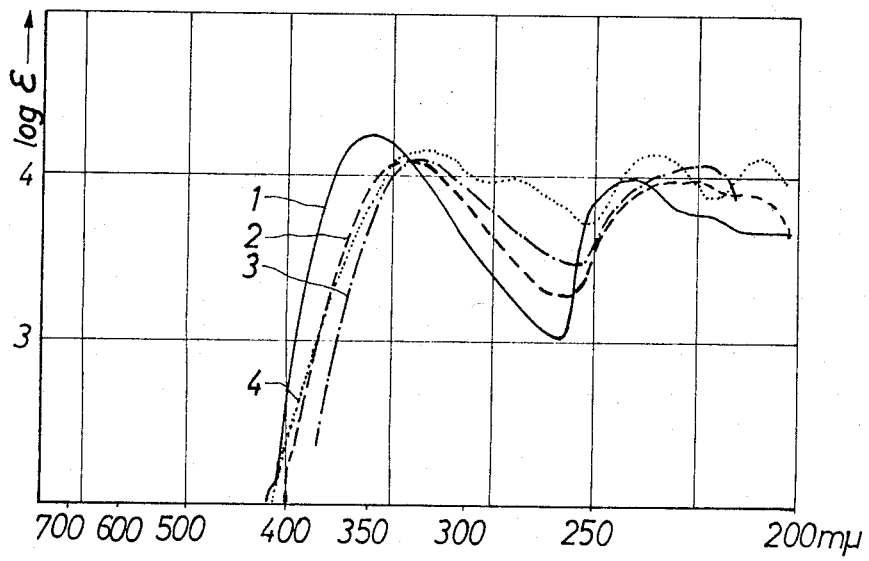
INVENTORS:
DOROTHEA LAUERER, MAX PESTEMER, MAX COENEN,
GUSTAV BUCHWALD.
BY Connolly & Hutz
ATTORNEY

United States Patent Office 3,278,448
Patented Oct. 11, 1966

3,278,448
ULTRA-VIOLET PROTECTIVE LIGHT FILTER
Dorothea Lauerer, Cologne-Stammheim, Max Pestemer, Opladen, Max Coenen, Gruiten, Rhineland, and Gustav Buchwald, Krefeld-Bockum, Germany, assignors to Farbenfabriken Bayer Aktiengesellschaft, Leverkusen, Germany, a corporation of Germany
Filed May 17, 1960, Ser. No. 29,719
10 Claims. (Cl. 252—300)

The present invention relates to ultra-violet light filters. Compounds absorbing ultra-violet rays are used to protect substances which are sensitive to light such as foodstuffs, dyestuffs, wood pulp, paper, plastics, fibrous materials and like materials against ultra-violet radiation either by admixing them directly with the substance to be protected or by incorporating them into a light-pervious support layer which is placed between the substance to be protected and the source of radiation, for instance light. The absorption of the ultra-violet light must start close up to the limit of the visible and ultra-violet range of the spectrum at 400 m$\mu$ so that the visible range can pass through without hindrance to avoid discoloration, whereas the ultra-violet range of rays is substantially absorbed. The filter media employed to protect the said light sensitive substances are therefore required to absorb light of higher wavelengths than the known skin-protecting agents which are to allow the ultra-violet light rays of high wavelengths (i.e. the range between 400 and 330 m$\mu$) to pass through as far as possible, since the aforesaid range contains the skin-pigment-forming rays. In order to guarantee complete protection for light sensitive substances the aforesaid range of 400 to 330 m$\mu$ must be absorbed. Besides, the compounds absorbing the ultra-violet rays are to be fast (or at least substantially fast) to light, since they have to be exposed to strong radiation. Moreover, they must not show an appreciable fluorescent effect, since fluorescent light brings about an opaque impression in the support layers.

In accordance with the present invention it has been found that the aforesaid conditions are satisfied to an excellent degree by using compounds of the general formula

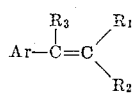

These compounds are, therefore, very useful as compounds absorbing ultra-violet rays. In the aforesaid formula, Ar denotes a phenyl radical which is substituted by one or more hydroxy groups or alkoxy groups and optionally by further groups such as for example halogen (chlorine, bromine) or alkyl groups; $R_1$ is CN, COOH, COX $(CH_2)_n \cdot COOH$, $(CH_2)_n COOR$; $R_2$ is H, alkyl, CN, COX, COOH; X stands for opitionally substituted alkyl or aryl radicals, primary, secondary or tertiary amino groups or alkoxy groups; $R_3$ is hydrogen, alkyl-, aralkyl, aryl-, amino-, substituted amino-, hydroxy-, alkoxy-, mercapto-, alkylmercapto- groups; and $n$ means an integer from 1 to 4.

Alkyl groups are preferably such containing up to 12 carbon atoms. As examples of compounds used according to the invention there may be mentioned:

4-hydroxy-cinnamic acid
4-hydroxy-cinnamic acid methyl or ethyl ester
4-hydroxy-$\alpha$-carbethoxy-cinnamic acid ethyl ester
4-hydroxy-$\alpha$-cyano-cinnamic acid ethyl ester
4-hydroxy-$\alpha$-cyano-cinnamic acid nitrile
4-hydroxy-$\alpha$-acetyl-cinnamic acid anilide
4-hydroxy-$\alpha$-phenyl-cinnamic acid
2-hydroxy-$\alpha$-diacetylstyrene
2-hydroxy-$\alpha$-anisoyl-cinnamic acid ethyl ester
2-hydroxy-$\alpha$-phenyl-cinnamic acid nitrile
4-hydroxy-3-methoxy-$\alpha$-diacetylstyrene
4-hydroxy-3-methoxy-$\alpha$-acetyl-cinnamic acid ethyl ester
4-hydroxy-3-methoxy-$\alpha$-acetyl-cinnamic acid anilide
3-hydroxy-4-methoxy-$\alpha$-acetyl-cinnamic acid ethyl ester
3-hydroxy-4-methoxy-$\alpha$-phenyl-cinnamic acid ethyl ester
2-hydroxy-3-methoxy-$\alpha$-diacetylstyrene
2-hydroxy-3-methoxy-$\alpha$-acetyl-cinnamic acid ethyl ester
2-hydroxy-3-methoxy-$\alpha$-anisoyl-cinnamic acid ethyl ester
4-hydroxy-3,5-di-tert.-butyl-$\alpha$-carbethoxy-cinnamic acid ethyl ester
4-hydroxy-3,5-di-tert.-butyl-$\alpha$-cyano-cinnamic acid ethyl ester (M.P.:9–93° C.)
4-hydroxy-3,5-di-tert.-butyl-$\alpha$-cyano-cinnamic acid nitrile
1-[4-hydroxy-3-methoxyphenyl]-3-oxo-penta-en(1,2)-5-carbonic acid
2-hydroxy-3,5-dichloro-$\alpha$-acetyl-cinnamic acid ethyl ester
4-methoxy-$\alpha$-cyano-cinnamic acid nitrile
4-hydroxy-$\beta$-methyl-$\alpha$-cyano-cinnamic acid nitrile
4-hydroxy-$\beta$-methyl-$\alpha$-carbmethoxy-cinnamic acid methyl ester
4-hydroxy-$\beta$-methyl-$\alpha$-cyano-cinnamic acid methyl or ethyl ester
4-methoxy-$\beta$-methyl-$\alpha$-cyano-cinnamic acid methyl ester
4-methoxy-$\beta$-methyl-$\alpha$-cyano-cinnamic acid amide
4-methoxy-$\beta$-methyl-$\alpha$-cyano-cinnamic acid nitrile
4-hydroxy-phenyl-$\beta$-methyl-$\alpha$-acetyl-cinnamic acid ethyl ester or their amide
$\alpha$-cyano-$\beta$-hydroxy-cinnamic acid nitrile
4-methoxy-3-chloro-$\alpha$-cyano-$\beta$-methoxy-cinnamic acid nitrile
$\alpha$-cyano-$\beta$-amino-cinnamic acid nitrile
$\alpha$-cyano-$\beta$-(phenylamino)-cinnamic acid nitrile
$\alpha$-cyano-$\beta$-(cyclohexylamino)-cinnamic acid nitrile
4-methoxy-3-chloro-$\alpha$-cyano-$\beta$-methyl-mercapto-cinnamic acid nitrile Near 400 m$\mu$ the absorption spectra of all these compounds show a steep gradient of the absorption curve the lowest branches of which extend only into the visible range of wavelength. Thus, the substances of the invention are only slightly yellowish which is no longer perceptible after incorporating the substances into the materials to be protected for instance foils or lacquers at a concentration of less than 0.5% by weight referred to the solid substance. The quantities of the compounds to be used according to the invention depend i.a. for instance on the thickness of the layer used and can easily be determined by preliminary tests.

Since even under the influence of long exposure in sunlight, these compounds are not changed chemically and discolored, not only is the material into which it is incorporated protected for a long time against the effect of ultra-violet rays, but also the material disposed underneath this material is protected from the damaging influence of light which contains ultra-violet portions before passing through the material. Owing to these advantageous properties, the compounds are suitable for a wide range of different purposes, such for example as a protective means for cotton or other natural products such as for coating, films, foils, threads, fibres, molded articles or other shaped elements consisting of synthetic plastics, for preventing or delaying the bleaching of dyeing on textile materials, as an additive to protective and filter layers for light-sensitive photographic films and papers as well as for photographic images and as additive to packing materials for light-sensitive goods or to lacquer.

In the accompanying diagrammatic drawing there are illustrated the absorption curves of some compounds according to the invention. The absorption curves are obtained by using the following compounds:

Curve 1: 4-hydroxy-β-methyl-α-cyano-cinnamic acid nitrile.

Curve 2: 4-hydroxy-β-methyl-α-cyano-cinnamic acid methyl ester.

Curve 3: 4-methoxy-β-methyl-α-cyano-cinnamic acid methyl ester.

Curve 4: 4-hydroxy-β-methoxy-α-diacetylstyrene.

The invention is further illustrated by the following examples, wherein the parts given are parts by weight.

EXAMPLE 1

15 parts of ethyl cellulose and 10 parts of dammar (free of wax) are dissolved in 60 parts of toluene. 0.15 part of 4-hydroxy-α-acetyl-cinnamic acid anilide is added. After the solution has been cast and after the solvent has evaporated, there is obtained a colorless, water-insoluble film which provides protection against ultra-violet rays and does not turn yellow in sunlight. Other film-forming agents, for example nitro-cellulose, can be used instead of ethyl cellulose.

EXAMPLE 2

3 mols of maleic acid anhydride, 7 mols of phthalic acid anhydride and 10 mols of ethylene glycol are esterified in known manner. The resulting unsaturated polyester resin is mixed with monostyrene at the ratio 3:1. 0.25 part of p-hydroxy-α-cyano-β-methyl-cinnamic acid ethyl ester are added per 100 parts of the solution. After the addition of 2% benzoyl peroxide the polyester resin thus stabilized to light is polymerized at 60° C. for 4 hours. In contradistinction to non-stabilized polyester resins, the test samples obtained do not show any discoloration after exposure to a mercury-vapour lamp for 200 hours.

EXAMPLE 3

When using in Example 2 the p-methoxy-derivative instead of p-hydroxy-α-cyano-β-methyl cinnamic acid ethyl ester, the test samples obtained therewith show an equally good stabilizing effect against ultra-violet radiation.

EXAMPLE 4

A commercial cellulose ester lacquer to which 0.5% of its weight of α-cyano-β-phenylene-amino-cinnamic acid nitrile was added, is applied by brushing onto sheet metal and exposed to a mercury-vapour lamp for 12 hours. In contra-distinction to a control coating which is not provided with a protective agent, the coating obtained according to the invention does not show any substantial yellowing.

What is claimed is:

1. A light filter for protecting substances from ultra-violet radiation, inclusive of light within the range of 330 mμ–400 mμ, the filter consisting essentially of a light pervious support layer having incorporated therewith a substantial light absorbing amount of a compound having the formula

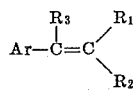

wherein Ar is a phenyl substituted by a member selected from the group consisting of hydroxy, alkoxy, and, when desired, at least one additional substituent selected from the group consisting of halogen and alkyl; $R_1$ is a member selected from the group consisting of CN, COOH, COX, $(CH_2)_n \cdot COOH$ and $(CH_2)_n COOR$, wherein R is lower alkyl; $R_2$ is a member selected from the group consisting of H, alkyl, CN, COOH and COX, wherein X is a member selected from the group consisting of an alkyl, aryl, amino, and alkoxy; $R_3$ is a member selected from the group consisting of an alkyl, amino, hydroxy, alkoxy, mercapto alkyl mercapto; and $n$ is a whole number of 1–4.

2. Ultra-violet protective light filter consisting of a film-forming composition having incorporated therein, in an amount sufficient to substantially absorb radiation in the range of 330 mμ–400 mμ, consisting of a film-forming composition having incorporated therein, in an amount sufficient to absorb ultra-violet rays, 4-hydroxy-phenyl-β-methyl-α-cyano-cinnamic acid nitrile.

3. Ultra-violet protective light filter consisting of a film-forming composition having incorporated therein, in an amount sufficient to substantially absorb radiation in the range of 330 mμ–400 mμ, consisting of a film-forming composition having incorporated therein, in an amount sufficient to absorb ultra-violet rays, 4-hydroxy-phenyl-β-methyl-α-cyano-cinnamic acid methyl ester.

4. Ultra-violet protective light filter consisting of a film-forming composition having incorporated therein, in an amount sufficient to substantially absorb radiation in the range of 330 mμ–400 mμ, consisting of a film-forming composition having incorporated therein, in an amount sufficient to absorb ultra-violet rays, 4-methoxy-phenyl-β-methyl-α-cyano-cinnamic acid methyl ester.

5. Ultra-violet protective light filter consisting of a film-forming composition having incorporated therein, in an amount sufficient to substantially absorb radiation in the range of 330 mμ–400 mμ, consisting of a film-forming composition having incorporated therein, in an amount sufficient to absorb ultra-violet rays, 4-hydroxy-phenyl-β-methoxy-α-diacetylstyrene.

6. A method for protecting and stabilizing a substance from ultra-violet light, inclusive of light within the wave length 330 mμ–400 mμ, consisting in incorporating into said substance, and, when desired, into a light pervious support layer interposed between said substance and an ultra-violet light source, a substantial light-absorbing amount of a compound having the formula

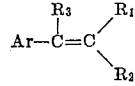

wherein Ar is a phenyl substituted by a member selected from the group consisting of hydroxy, alkoxy and, when desired, at least one additional substituent selected from the group consisting of halogen and alkyl; $R_1$ is a member selected from the group consisting of CN, COOH, COX, $(CH_2)_n \cdot COOH$ and $(CH_2)_n COOR$, wherein R is lower alkyl; $R_2$ is a member selected from the group consisting of H, alkyl, CN, COOH and COX, wherein X is a member selected from the group consisting of an alkyl, aryl, amino, and alkoxy; $R_3$ is a member selected from the group consisting of an alkyl, amino, hydroxy, alkoxy, mercapto alkyl mercapto, and $n$ is a whole number of 1–4.

7. A method according to claim 6 wherein said incorporated compound is 4-hydroxy-phenyl-β-methyl-α-cyano-cinnamic acid nitrile.

8. A method according to claim 6 wherein the compound is 4 - hydroxy-phenyl-β-methyl-α-cyano-cinnamic acid methyl ester.

9. A method according to claim 6 wherein the compound is 4 - methoxy-phenyl-β-methyl-α-cyano-cinnamic acid methyl ester.

10. A method according to claim 6 wherein the compound is 4-hydroxy-phenyl-β-methoxy-α-diacetylstyrene.

(References on following page)

References Cited by the Examiner

UNITED STATES PATENTS

| | | | |
|---|---|---|---|
| 2,440,070 | 4/1948 | Blout et al. | 252—300 |
| 3,074,971 | 1/1963 | Strobel et al. | |

FOREIGN PATENTS

| | | |
|---|---|---|
| 588,864 | 12/1959 | Canada. |
| 662,646 | 7/1938 | Germany. |

OTHER REFERENCES

Plaisted, Contributions From Boyce Thompson Institute, vol. 18, No. 5, October–December 1955, pages 231–234.

MORRIS LIEBMAN, *Primary Examiner.*

JOHN H. MACK, JOSEPH R. LIBERMAN, JOHN R. SPECK, A. LIEBERMAN, R. D. EDMONDS, *Assistant Examiners.*

---

Notice of Adverse Decision in Interference

In Interference No. 95,964 involving Patent No. 3,278,448, D. Lauerer, M. Pestemer, M. Coenen and G. Buchwald, ULTRA-VIOLET PROTECTIVE LIGHT FILTER, final judgment adverse to the patentees was rendered July 1, 1969, as to claims 1, 2, 6 and 7.

[*Official Gazette September 2, 1969.*]

Notice of Adverse Decision in Interference

In Interference No. 95,964 involving Patent No. 3,278,448, D. Lauerer, M. Pestemer, M. Coenen and G. Buchwald, ULTRA-VIOLET PROTECTIVE LIGHT FILTER, final judgment adverse to the patentees was rendered July 1, 1969, as to claims 1, 2, 6 and 7.

[*Official Gazette September 2, 1969.*]